(No Model.)
G. W. & S. TAYLOR.
WHEEL CULTIVATOR.
No. 312,228. Patented Feb. 10, 1885.
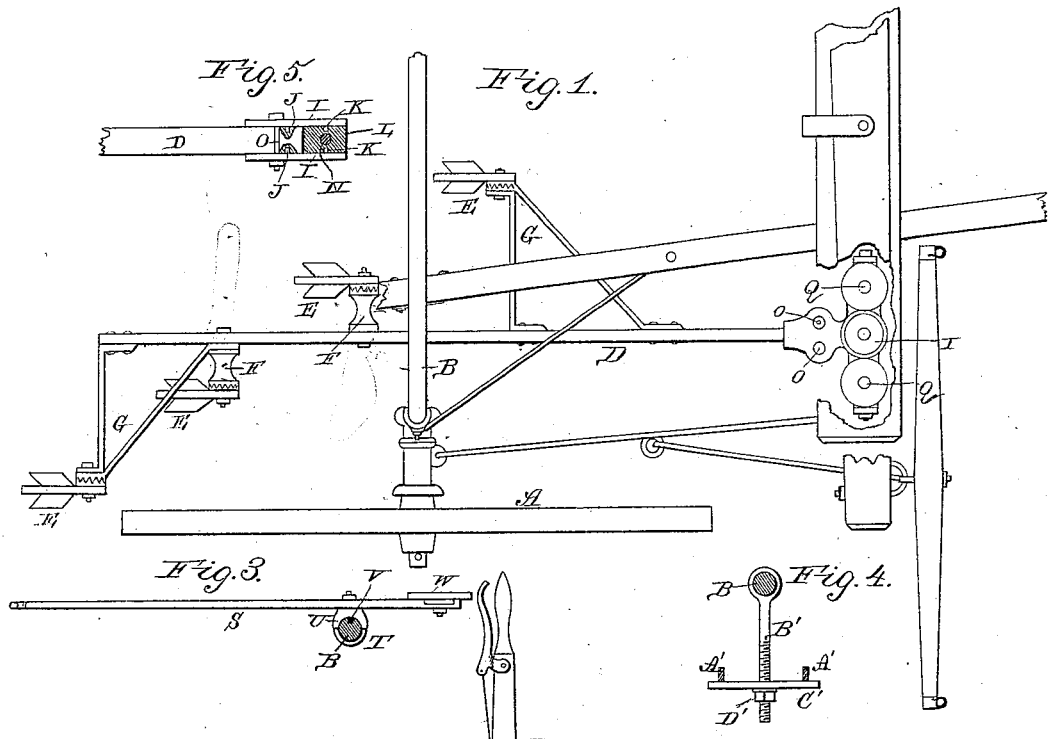
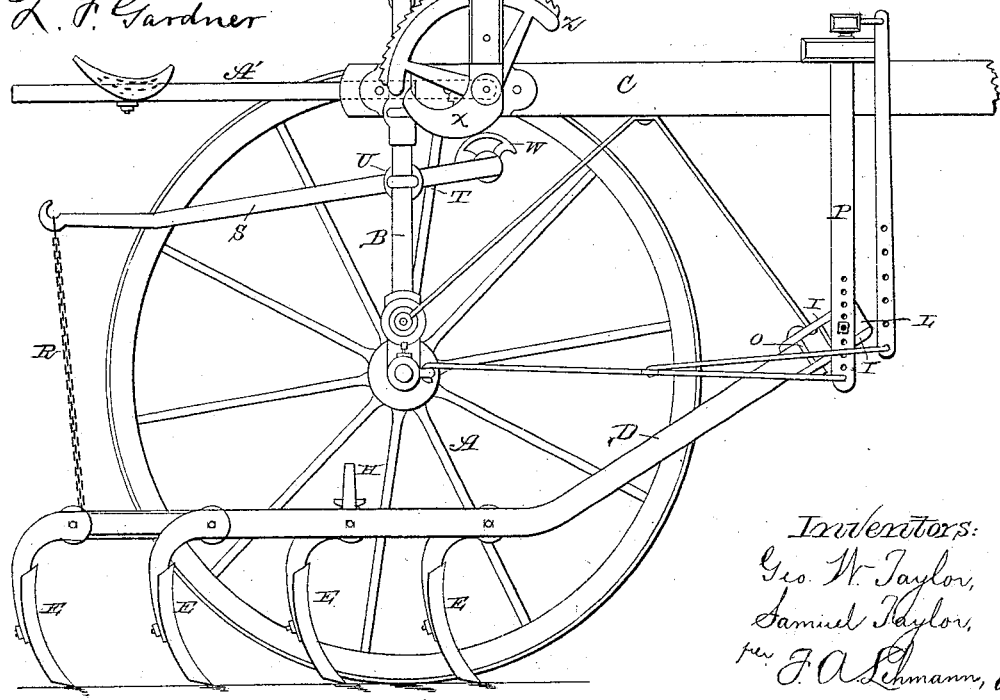
Witnesses:
J. W. Garner
L. F. Gardner
Inventors:
Geo. W. Taylor,
Samuel Taylor,
per F. A. Lehmann, Atty.

UNITED STATES PATENT OFFICE.

GEORGE W. TAYLOR AND SAMUEL TAYLOR, OF SMYRNA, DELAWARE.

WHEEL-CULTIVATOR.

SPECIFICATION forming part of Letters Patent No. 312,228, dated February 10, 1885.

Application filed October 8, 1884. (No model.)

*To all whom it may concern:*

Be it known that we, GEORGE W. TAYLOR and SAMUEL TAYLOR, of Smyrna, in the county of Kent and State of Delaware, have invented certain new and useful Improvements in Wheel-Cultivators; and we do hereby declare the following to be a full, clear, and exact description of the invention, such as will enable others skilled in the art to which it pertains to make and use it, reference being had to the accompanying drawings, which form part of this specification.

Our invention relates to an improvement in wheel-cultivators; and it consists, first, in the combination of the operating hand-lever having a cam formed upon its lower end, a lever which is pivoted upon the bent axle, and which has a segment of a circle formed upon its front end, and which pivoted lever is attached at its rear end by means of a chain to the rear end of the beam; second, the combination of the seat-frame, which is pivoted upon the frame of the cultivator, a hooked screw-bolt, which is hung upon the axle, a plate for catching under the seat-frame, and a thumb-nut, by means of which the seat-frame is adjusted vertically; third, the combination of the beam having notches formed in its front end, two clamping-plates provided with projections on their inner sides, clamping-bolts which pass through the plates, and the casting which is pivoted upon a suitable supporting rod or bolt at the front end of the cultivator-frame, all of which will be more fully described hereinafter.

The object of our invention is to provide a cultivator in which the beams are provided with a number of shovels, all of which can be kept even and level in the ground, and in which the different parts can be operated by a single person at the same time that he does the driving with a common cultivator.

Figure 1 represents a plan view of a portion of a cultivator embodying our invention. Fig. 2 is a side elevation of the same. Fig. 3 is a detail showing the manner of pivoting the levers upon the axle. Figs. 4 and 5 are detail views.

A represents the wheels, B the bent axle, and C the cultivator-frame, all of which are constructed in the ordinary manner. The beams D, of which there are two, are curved upward at their front ends, as shown in Fig. 2, and each one has secured to it the four shovels E. Two of these shovels E are set out from the beam upon its opposite sides by means of the blocks F, which blocks have ratchets formed in their outer ends, for the purpose of adjusting the shovels at any desired angle in the usual manner. The other two shovels E are set out from the beam upon opposite sides by means of the triangular frames G, which are also provided with ratchets, as shown, for the adjustment of the shovels. These four shovels are separated from each other just far enough laterally to enable the whole of a row between the growing plants to be cultivated at once. The front end of each beam is turned upward at or about the angle shown, for the purpose of enabling all four of these shovels to be held evenly in the ground without any great effort on the part of the operator. Where the beams are straight and four shovels attached to them, either great effort is required upon the part of the driver to hold the shovels in the ground, or else the shovels will run in the ground so unevenly that the work will be but very imperfectly done at best. Where the ends of the beams are turned upward, as here shown, the driver, by keeping his feet in the stirrups H, attached to the beams, can move the beams laterally and keep all four of the shovels pressed evenly in the earth with but very little exertion. Each of the beams is connected to the two plates I by means of the projections J, which are formed upon the inner sides of the plates, and which catch in corresponding recesses made in the front ends of the beams from opposite edges. These plates I also have projections K made on the inner side of their front ends, and which catch in corresponding recesses in the castings L, which are pivoted upon the bolts N. The two plates I are clamped tightly against the edges of the beams by means of the bolts O, and against opposite sides of the castings L. The castings L being free to turn upon the bolts N, and the plates I being pivoted upon the castings by means of the projections K, a universal movement is given to the beams. The bolts N pass through suitable hangers, P, which project down from the frame C in the usual manner. In order to enable the beams D to be adjusted laterally in relation to each other, in the top of the castings L are made a series of openings, Q, for the projections K to catch in. The beams D are supported at their front ends by means of the castings L, as above described, and at their rear ends by means of the chains R. Being thus supported from their front and rear ends only, instead of at their front end and some intermediate point, as has heretofore been the case, and by having their front ends curved upward, as shown, the points of the shovels are kept on about a level when they are raised from and lowered to the earth. The chains R are connected at their upper ends to the rear ends of the levers S, which are pivoted, by means of the eye-bolts T and the castings U, upon the vertical portions of the bent axle. The eyebolts T are passed over the vertical portions of the axle, and then through the castings U, against which the levers S rest, and then the parts are clamped in position by means of a nut. In order to prevent these levers S from slipping down upon the axle, upon the inner side of each casting U is formed a sharp projection, V, which catches in the side of the axle, and thus prevents the parts from becoming displaced.

Upon the front end of each pivoted lever S is formed a segment of a circle, W, against which the cam X upon the lower end of each operating hand-lever Y is made to bear. By means of the cam X and the segment W the operating-lever Y and the lever S are made separate from each other, and thus the levers S can be quickly grasped by the driver, for the purpose of raising the shovels out of the earth to avoid running against some obstruction. With this operating hand-lever Y and the levers S connected together, the levers S could not be moved independently of the levers Y, as is sometimes very desirable. The lever Y is provided with a suitable spring-catch, which engages with the ratchet-teeth of the segment Z, for the purpose of holding the lever Y in any desired position. The seat-frame A' is made U-shaped, and its front ends are pivoted to the frame, either upon the same bolts upon which the hand-levers Y are pivoted, or upon other bolts provided especially for the purpose, as may be preferred. The seat-frame A' is supported upon the axle B by means of the hooked bolt B', which passes down in between the seat-frame and through the plate C', which catches against the under side of the seat-frame, as shown in Fig. 4. Upon the lower screw-threaded end of the bolt B' is placed a thumb-nut, D', by means of which the seat-frame can be raised and lowered upon the bolt B', according to the height of the driver. The driver, sitting upon the seat, which is movable back and forth upon the frame A', drives the team, while he guides the two beams D by means of his feet, which catch in the stirrups H.

Having thus described our invention, we claim—

1. The combination of the beams D, having recesses in opposite edges, the plates I, provided with the projections J K, the castings L, provided with the recesses Q, and the clamping-bolts O, substantially as described.

2. The combination of the axle, the pivoted levers S, and segment W, and the operating hand-lever Y, provided with the cam upon its lower end, the rear end of the lever being connected to the beam D by means of a chain, R, substantially as set forth.

3. The combination of the operating hand-lever Y, provided with a cam upon its lower end, the lever S, having cam W, the eyebolt T, and the casting U, provided with the projection V, substantially as specified.

In testimony whereof we affix our signatures in presence of two witnesses.

GEORGE W. TAYLOR.
SAMUEL TAYLOR.

Witnesses:
HENRY D. BOYER,
HENRY G. BUDD.